(12) United States Patent
Putney

(10) Patent No.: US 8,272,824 B1
(45) Date of Patent: Sep. 25, 2012

(54) APPARATUS FOR INSTALLING POLES FOR POLE BUILDINGS

(76) Inventor: Lloyd Pete Putney, New Virginia, IA (US)

( * ) Notice: Subject to any disclaimer, the term of this patent is extended or adjusted under 35 U.S.C. 154(b) by 389 days.

(21) Appl. No.: 12/722,987

(22) Filed: Mar. 12, 2010

Related U.S. Application Data

(63) Continuation-in-part of application No. 11/842,507, filed on Aug. 21, 2007, now abandoned.

(51) Int. Cl.
*A01G 23/02* (2006.01)
*B65F 1/00* (2006.01)
*B66C 1/00* (2006.01)

(52) U.S. Cl. ............. 414/23; 901/14; 414/555; 414/740

(58) Field of Classification Search .................... 173/40; 175/57, 85; 414/10, 22.55, 23, 24, 589, 590, 414/618–623, 628, 632–634, 637, 655, 660, 414/684.3, 686, 687, 692, 729, 732, 735, 414/743, 744.2–744.5, 745.2, 920; 52/116; 901/14, 16–18
See application file for complete search history.

(56) References Cited

U.S. PATENT DOCUMENTS

| | | | |
|---|---|---|---|
| 2,255,241 A | 9/1941 | Brown | |
| 3,447,613 A | 6/1969 | Lisenby | |
| 3,450,274 A | 6/1969 | Johansson | |
| 3,500,938 A | 3/1970 | Watson | |
| 3,507,338 A * | 4/1970 | Alexander et al. | 173/28 |
| 3,529,679 A | 9/1970 | Leven | |
| 3,576,218 A | 4/1971 | Lisenby | |
| 3,623,620 A | 11/1971 | Vermette | |
| 3,769,782 A | 11/1973 | Cler | |
| 3,774,781 A | 11/1973 | Merkley | |
| 3,797,672 A | 3/1974 | Vermette | |
| 3,834,560 A | 9/1974 | Miller | |
| 3,848,515 A | 11/1974 | Gardineer et al. | |
| 3,893,580 A * | 7/1975 | Stevens | 414/632 |
| 4,088,289 A * | 5/1978 | Wood et al. | 248/647 |
| 4,124,047 A | 11/1978 | Dressler et al. | |
| 4,132,318 A | 1/1979 | Wang et al. | |
| 4,175,998 A | 11/1979 | Hay, II et al. | |
| 4,718,816 A | 1/1988 | King | |
| 4,775,276 A | 10/1988 | McMillan | |
| 5,058,638 A | 10/1991 | Hacker et al. | |
| 5,083,895 A * | 1/1992 | McBirnie | 414/739 |
| D332,058 S | 12/1992 | Gruetzmacher | |
| 5,201,816 A | 4/1993 | Schivley, Jr. | |
| 5,207,004 A | 5/1993 | Gruetzmacher | |
| 5,213,169 A | 5/1993 | Heller | |
| 6,382,594 B1 | 5/2002 | Ransom | |
| 6,494,515 B1 | 12/2002 | Kalbfleisch | |
| 6,655,899 B1 | 12/2003 | Emerson | |
| 7,588,403 B2 | 9/2009 | Symonds | |
| 2002/0192053 A1* | 12/2002 | Ewington | 414/23 |
| 2003/0155037 A1 | 8/2003 | Alexander | |

* cited by examiner

*Primary Examiner* — Gregory Adams
(74) *Attorney, Agent, or Firm* — Sturm & Fix LLP

(57) ABSTRACT

An apparatus is provided for facilitating quick and accurate placement of a pole in a post hole for building pole buildings and for holding the post in such position during backfilling, tamping and/or concrete placement in the post hole. A post clamping device holds the post during a time when other adjusting aspects of the present invention can be used to move a post up or down, from side to side in at least two directions, tipping in any direction and rotation about a vertical axis of the post.

17 Claims, 13 Drawing Sheets

APPARATUS FOR INSTALLING POLES FOR POLE BUILDINGS

CROSS-REFERENCE TO RELATED APPLICATIONS

This is a Continuation in Part of U.S. patent application Ser. No. 11/842,507 filed Aug. 21, 2007, which is incorporated herein by reference in its entirety and from which priority is being claimed.

BACKGROUND OF THE INVENTION

1. Field of the Invention

The present invention relates generally to an attachment to a prime mover, such as a skid loader, and more particularly to an apparatus for facilitating quick and accurate placement of poles in a post hole for building pole buildings.

2. Background Art

When building pole buildings a most important first step is to install poles in the ground at specified places. It is very important to set the poles so they extend straight up vertically from the ground. If the poles are not leveled and square so they are all vertical and substantially parallel with one another, this can cause structural defects in the pole building that is being constructed.

Prior art installation of poles for pole buildings typically involves starting with a string line to outline the location of the building to be built, drilling post holes in the ground, placing a pole in each post hole and then using a post level to simultaneously check and adjust the position of each post while backfilling and tamping of the dirt in the hole is done, often in combination with putting concrete in the hole as well or using concrete to fill the entire hole around the post.

It is a problem first to get each respective post in a perfectly vertical position and secondly to be able to hold the post straight while performing these backfilling, tamping and or concrete filling operations.

U.S. Pat. No. 6,494,515 to Kalbfleisch shows a device attached to a skid loader for clamping a post in a horizontal position, lifting the post, turning the post from a horizontal position to a vertical position so it can be lowered into a post hole, but it does not have a precise way to adjust the post to make sure it is perfectly vertical during the process of backfilling, tamping and or adding concrete to the post hole around the post.

Accordingly, there is a need for a method and apparatus to overcome the aforesaid problems.

BRIEF SUMMARY OF THE INVENTION

The present invention relates an apparatus for facilitating quick and accurate placement of poles in a post hole for building pole buildings and for holding the post in such position during backfilling, tamping and/or concrete placement in the post hole. A post clamping device holds the post during a time when other adjusting devices can be used to move a post up or down, from side to side, tipping in any direction and rotation about a vertical axis of the post.

An object of the present invention is to provide an apparatus for facilitating quick and accurate placement of poles in a post hole for building pole buildings Other objects, advantages, and novel features of the present invention will become apparent from the following detailed description of the invention when considered in conjunction with the accompanying drawings.

BRIEF DESCRIPTION OF THE DRAWINGS

These and other attributes of the invention will become more clear upon a thorough study of the following detailed description of the invention, particularly when reviewed in conjunction with the following drawing figures, wherein.

DETAILED DESCRIPTION OF THE INVENTION

Figure 1:
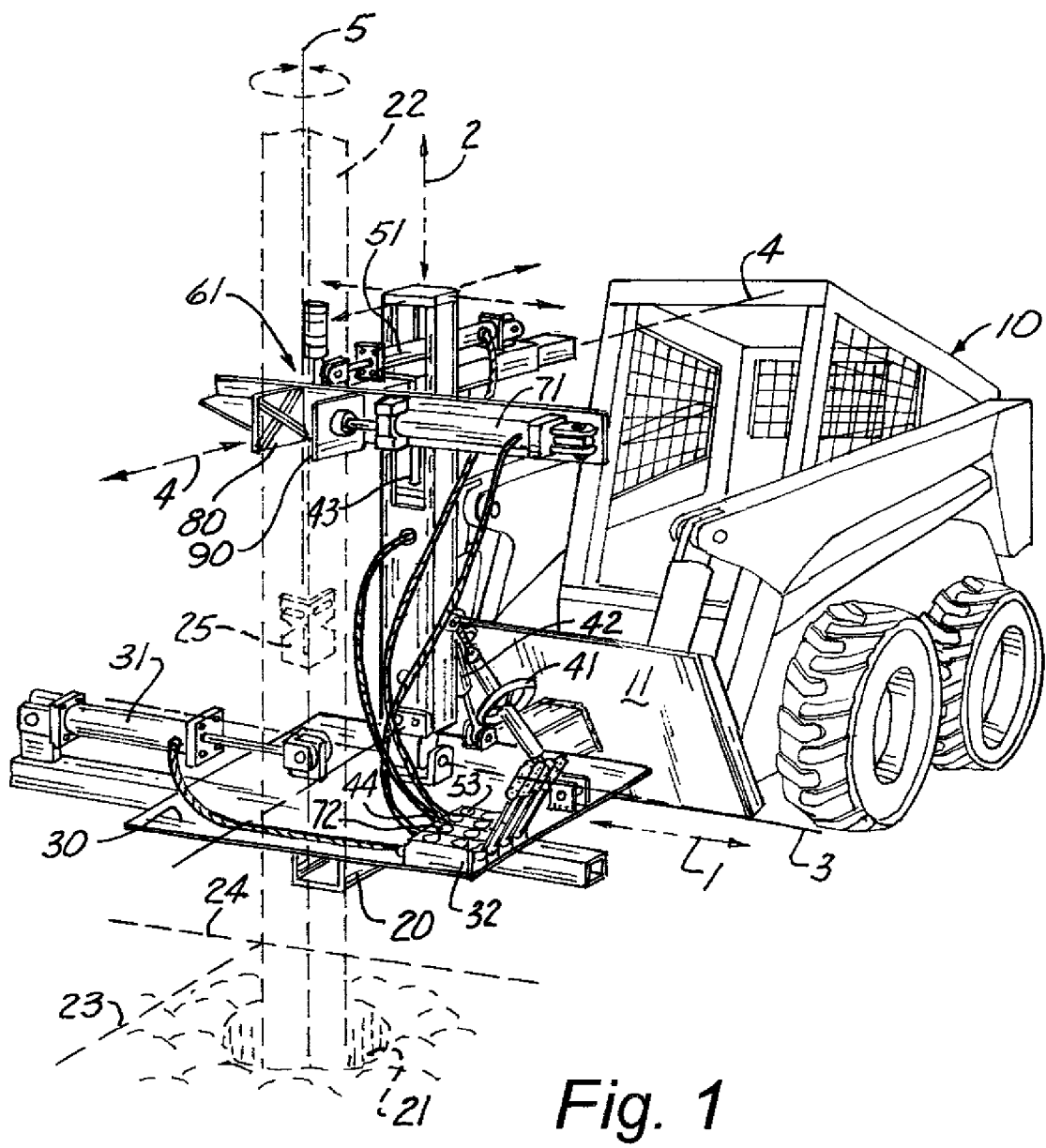
FIG. 1 is a perspective view of the present invention attached to a skid loader and showing a post and post hole in dashed lines to illustrate how a post can be quickly, easily and accurately placed in a post hole and held in a proper position while the post hole is backfilled, tamped and/or while concrete is placed in the post hole.

Referring now to the drawings wherein like reference numerals designate identical or corresponding parts throughout the several views, FIG. 1 shows a preferred embodiment of the present invention for installing poles for pole buildings attached to a skid loader 10. A frame 20 is shown welded to the skid loader 10 via a universal type attachment plate 11. A mounting plate 30 is slideably attached to the frame 20 along a first axis 1 as can best be seen in FIG. 2, by brackets 13, which extend around and are slideable on beam 12.

Figure 2:
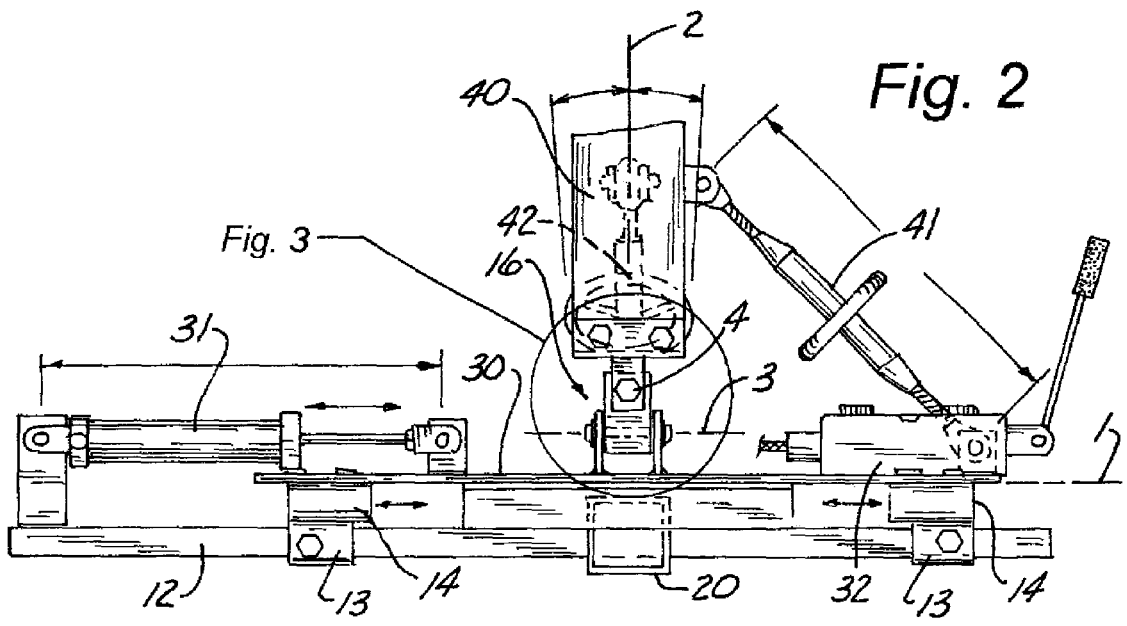
FIG. 2 is a front elevational view of a lower portion of the preferred embodiment showing how a universal joint permits virtually unlimited tipping of the upper part of the apparatus and how a hydraulic cylinder can be used to slide a base plate from side to side.
Figure 3:
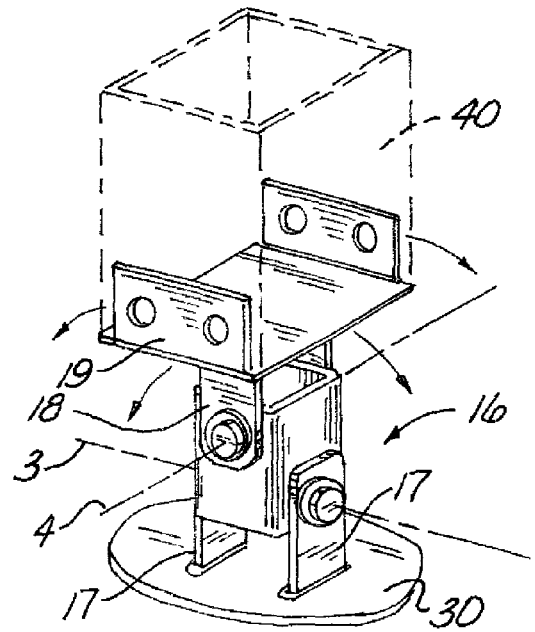
FIG. 3 is an enlarged perspective view of the universal joint shown in FIGS. 1 and 2.

Looking to FIGS. 2 and 3, a first member 40 has a second axis 2, shown best in FIG. 1, the first member 40 being operatively pivotally attached to the plate 30 for pivoting about a third 3 and a fourth axis 4. A first hydraulic cylinder actuator 31 is operatively attached to the frame 20, via beam 12, and to the plate 30 for moving the plate 30 back and forth along the first axis 1 thereof using a first hydraulic valve 32. The first member 40 is attached to the plate 30 by the universal joint 16 shown in detail in FIG. 3. Tabs 17 are welded to plate 30, tabs 18 welded to bracket 19 and pins 21 and 22 allow pivoting of the first member 40 about axes 3 and 4, respectively.

Looking at FIGS. 1 and 2, a second turnbuckle type actuator 41 is operatively attached to the mounting plate 30 and to the first member 40 for selectively pivoting the first member 40 about the third axis 3.

Looking at FIG. 1 again, a turnbuckle type third actuator 42 is operatively attached to the mounting plate 30 and to the first member 40 for selectively pivoting the first member 40 about the fourth axis 4.

Figure 4:
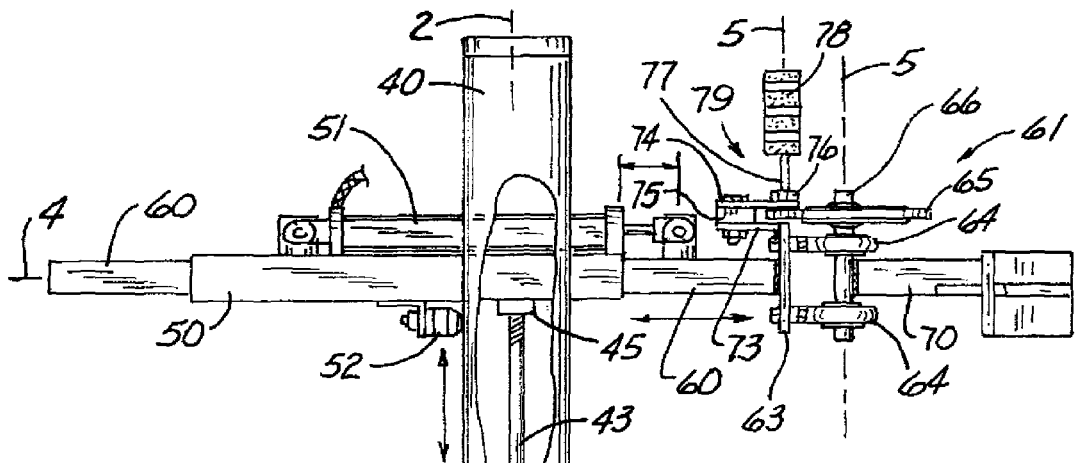
FIG. 4 is a rear view of an upper portion of the preferred embodiment showing a hydraulic cylinder in dashed lines for raising or lowering a post clamping structure and also showing how another hydraulic cylinder controls the post clamping structure and also showing a mechanism to permit pivoting of the clamping structure about a vertical axis.

As can best be seen in FIGS. 1 and 4, a second member 50 is rigidly attached to the first member 40 and is moveable up or down along the second axis 2 via a sixth actuator 43, which is a hydraulic cylinder, operatively attached to the first and second members 40 and 50 for selectively moving the second member 50 up or down along the second axis 2 with respect to the first member 40 and is controlled using a hydraulic valve 44 as shown in FIG. 1. A threaded nut 45, welded to second member 50, has the post part of hydraulic cylinder 43 threaded onto it. Conveyor type bearings 52, attached to member 50, contact member 40 and reduce the friction of the member 50 as it slides up or down with respect to member 40.

Figure 6:
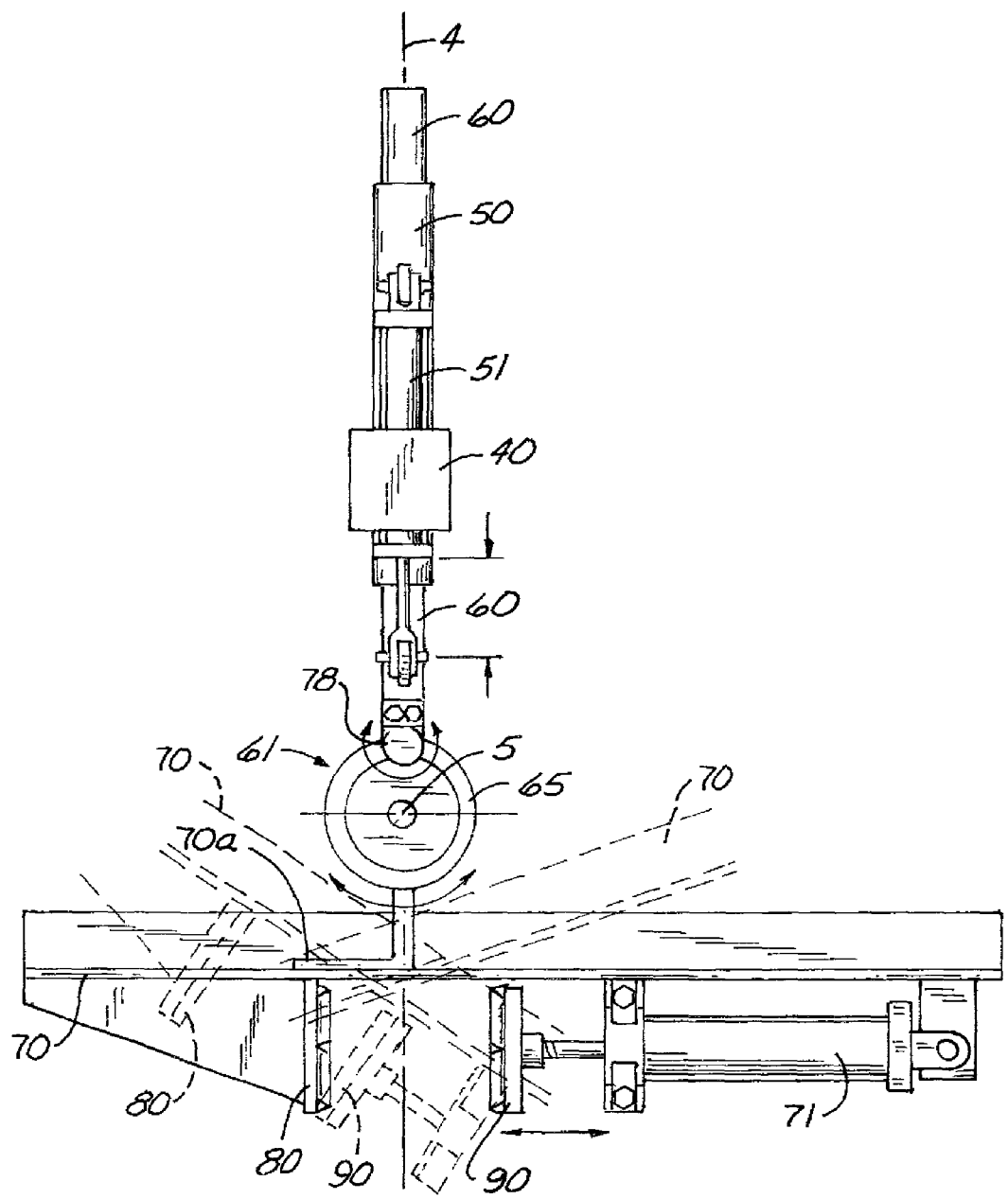
FIG. 6 is a top plan view showing the structure that permits the clamping device to be pivoted about a vertical axis among the positions shown in solid and dashed lines in FIG. 6, and the hydraulic cylinder that permits the clamping structure to be moved forwardly or backwardly as shown in FIG. 1.

A third member 60, as best shown in FIGS. 1, 4 and 6, is telescopically disposed inside of the second member 50 for movement in a direction in or out along an axis 4 substantially perpendicular to the second axis 2. A fourth actuator 51, which is a hydraulic cylinder, is operatively attached to the second member 50 and to the third member 60 for selectively moving the third member 60 along the fourth axis 4 with respect to the second member 50. A hydraulic valve 53, as can be seen in FIG. 1, is used to control the hydraulic cylinder 51.

Looking now to FIGS. 1, 4, 6 and 7, a fourth member 70 is operatively pivotally attached to the third member 60 about a fifth axis 5 substantially parallel to the second axis 2. Fourth member 70 as seen in FIG. 6 is considered to be the L-shaped member 70a which is welded to the member identified as fourth member 70 in FIG. 6. Of course the fourth member 70 could all be made of one piece or of more pieces than shown in the preferred embodiment shown in the drawings.

A plate 63 is welded to one end of the third member 60 as can best be seen in FIG. 4. Bearings 64 are attached to the plate 63. A disc 65, which can be like a disc brake on an automobile, is rigidly attached to a rod 66, which rod 66 is, in turn welded to the fourth member 70 thereby allowing the fourth member 70 to pivot along axis 5 with respect to the third member 60 as can best be seen in FIG. 7.

Figure 7:
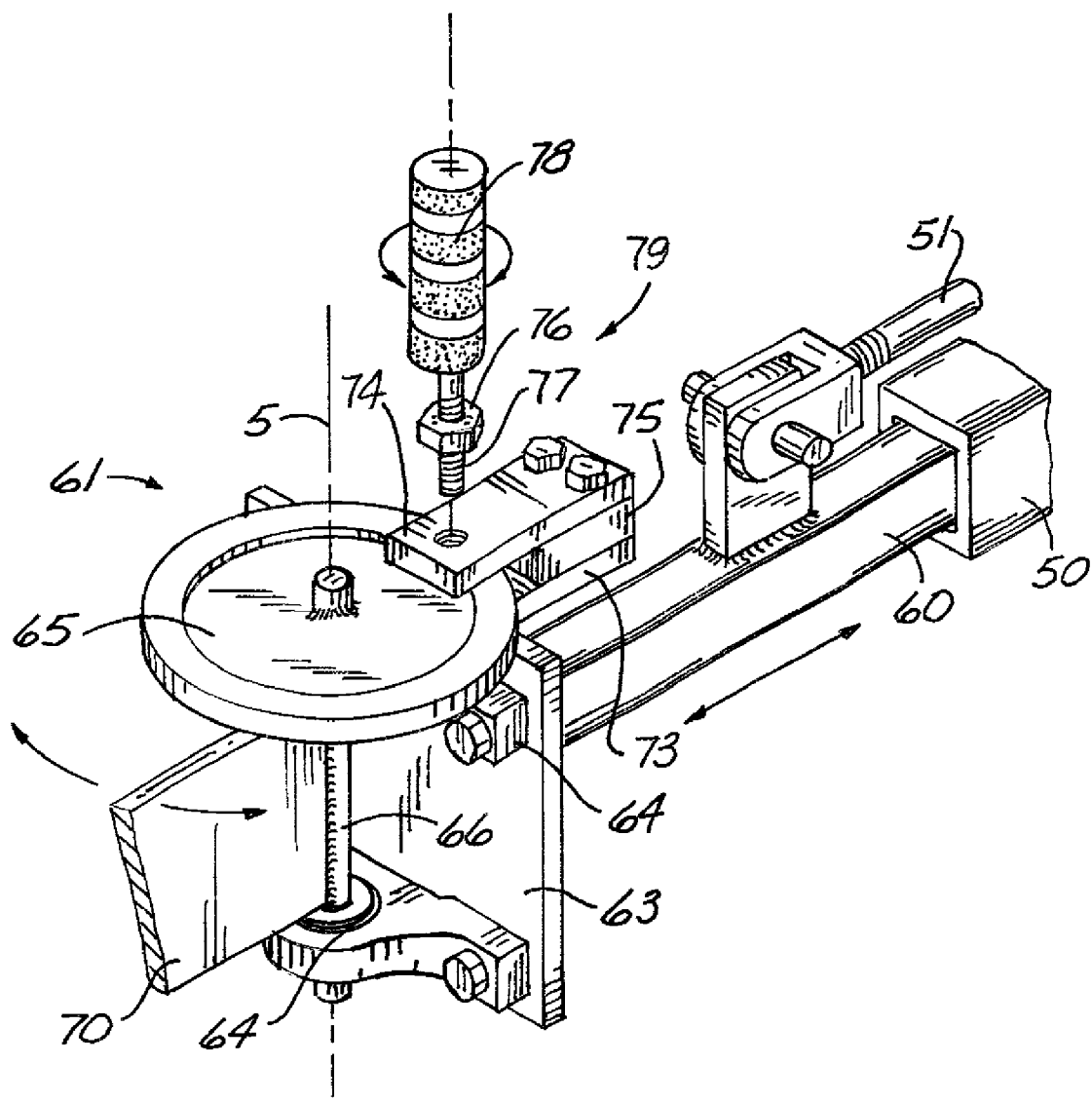
FIG. 7 is an enlarged perspective view of the structure permitting the pivoting of the clamping structure about a substantially vertical axis and a mechanism for locking the clamping structure in a desired pivoted position.

A locking mechanism 79 as seen in FIGS. 4 and 7, include a plate 73, welded to plate 63 and a plate 74, bolted rigidly to the plate 73 with a spacer 75 disposed between the plates 73 and 74 so that the disc 65 can rotate between the plates 73 and 74. A threaded nut 76 is welded to the plate 74 to receive threaded end 77 of a stop member 78. When it is desired to hold the plate 65 and fourth member 70 in a desired position, the stop member 78 is rotated to tighten the threaded end 77 tightly against the disc 65 to frictionally hold the disc 65 and fourth member 70 from rotating with respect to third member 60 about axis 5.

A fifth actuator 71, which is a hydraulic cylinder, is operatively attached to the fourth member 70 and to the second clamping device 90 for controlling selective movement of the second clamping device 90 with respect to the first clamping device 80. The first clamping device 80 is rigidly attached to the fourth member 70 and a second clamping device 90 is operatively attached to the fourth member 70 via a hydraulic cylinder 71 for movement back and forth towards and away from clamping device 80 using a hydraulic valve 72, which is shown in FIG. 1.

In operation, a string line is constructed to define the outline of the building. Then the places where the posts are to be inserted into the ground are marked. Then the post holes are dug.

Figure 5:
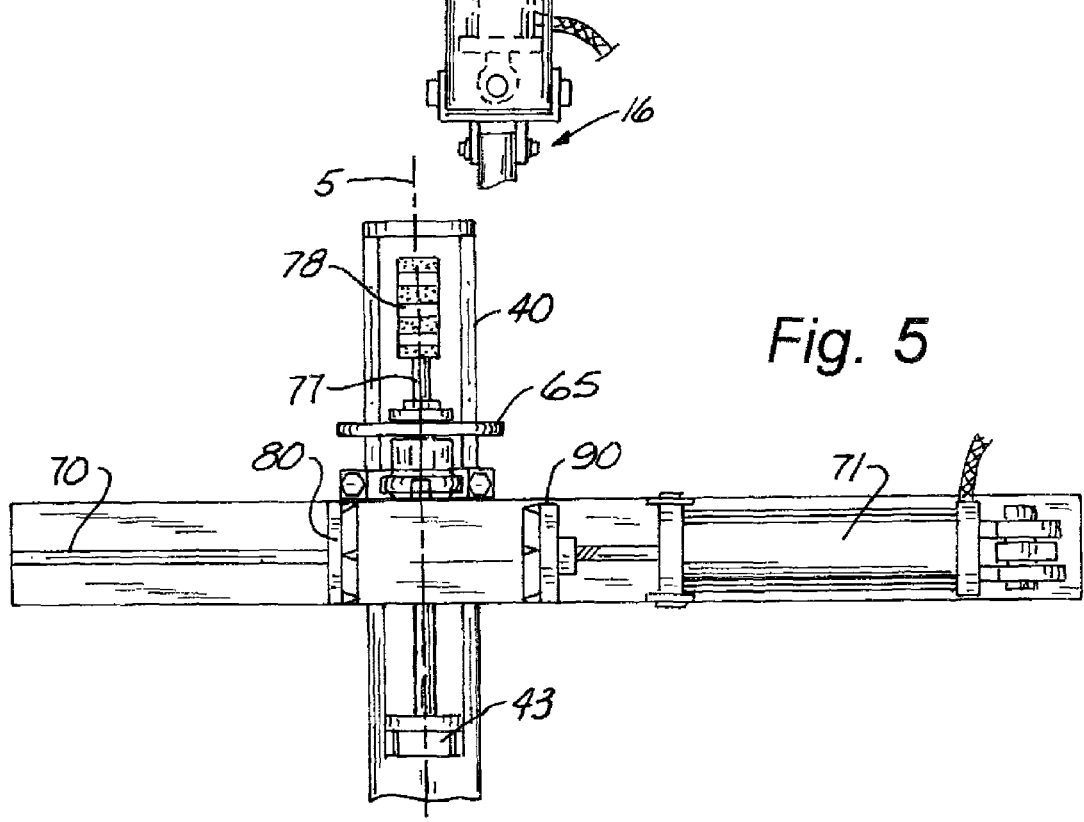
FIG. 5 is a side elevational view from the right side of FIG. 4.

The post 22 is typically first placed in a post hole 21 as shown in dashed lines in FIG. 1, which could be done manually or with mechanized equipment. Then the skid loader with the invention attached thereto is driven towards the post 22 with the clamping devices 80 and 90 farther apart than the width of the post 22, for example as shown in FIG. 5. When the clamping devices 80 and 90 are disposed on each side of the post 22, the valve 72 is actuated to shorten the length of the hydraulic cylinder 71, which will cause the clamping device to push the post against clamping device 80 and securely hold the post 22.

After the post 22 has been clamped as shown in FIG. 1, the valve 44 is used to lengthen the hydraulic cylinder 43, which will raise the second member 50 and everything attached to it, including post 22. With the post 22 slightly raised off of the bottom of the post hole 21, the post is "leveled" in all directions until it is completely vertical and moved into position so it is aligned with and adjacent to the string line.

It is not so important which of the leveling steps are done first, but here is one way it can be done. Assuming that the post 22 is on a corner of the building to be constructed there will be two perpendicular string lines 23 and 24 shown in dashed lines in FIG. 1. The mechanism 61 shown in FIGS. 1 and 4-7 is utilized to make the sides of the post closest to the string lines 23 and 24 parallel to the string lines by loosening the handle 78 to allow the post 22 to pivot with respect to the string line about axis 5. After the desired pivoting of the post 22 has been done, then the handle 78 is tightened so that the threaded rod 77 is in solid contact with the disc 65, which will prevent further rotation about the axis 5.

At that time then valve 32 is used to actuate the hydraulic cylinder 31 to move the post 22 towards and wherein the closest side of the post 22 is in close alignment with, i.e.

parallel with, the string line 23. After that, the valve 53 is actuated to cause the hydraulic cylinder 51 to move the post 22 towards the string line 24 until the post 22 is close to and the closest side of the post 22 is aligned with, i.e. parallel with, the string line 24.

A next step is to put a post level 25, as shown in FIG. 1, onto the post 22. This post level 25 can be of the type shown in U.S. Pat. Nos. Des. 332,058 and 5,207,004, both to Gruetzmacher, and both of which are incorporated herein by reference in their entirety. While viewing the post level 25, turnbuckle 41 is adjusted to pivot the post 22 about axis 4 and turnbuckle 42 is adjusted to pivot the post 22 about axis 3, until the post is completely vertical. Then the valve 44 is actuated again to cause the hydraulic cylinder 43 to lower the post 22 until it is firmly back against the bottom of the post hole 21.

At that time the post 22 is accurately held in a vertical position. Then the dirt is backfilled and tamped into the hole 21 around the post 22. Alternatively, concrete can be place in the hole 21, or at least the bottom part of the hole 21 and more backfilling can occur to hold the post 22 in place until the concrete cures, while at the same time the post is held in the vertical position by the backfilling of the dirt. Once the backfilling has occurred, the operator can move on to install the next post in the next post hole using the same or a similar procedure.

Figure 8:
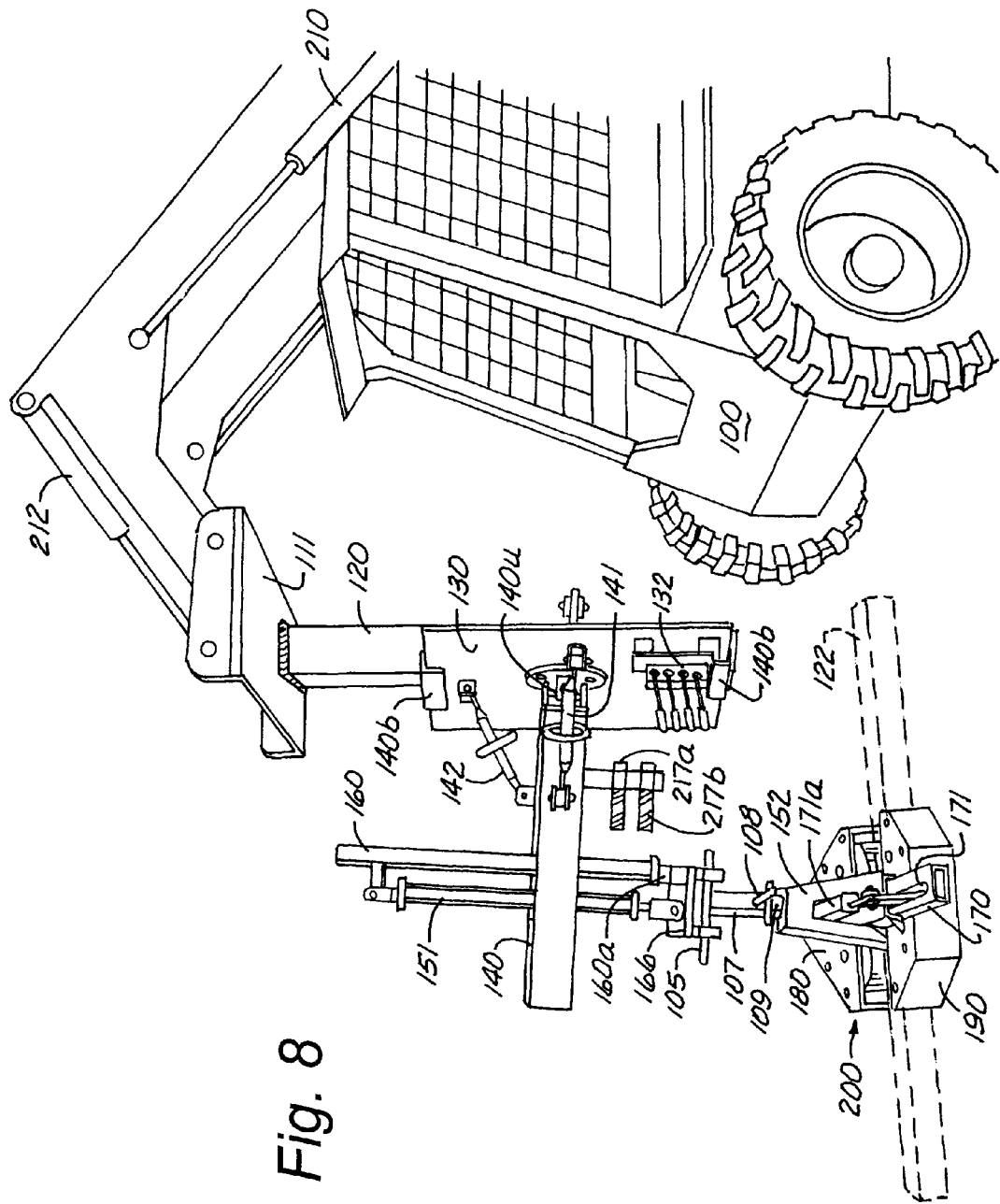
FIG. 8 is a perspective view of a second embodiment of the present invention attached to a skid loader and showing a post and post hole in dashed lines to illustrate how a post can be quickly, easily and accurately grasped while the post is on the ground.

A second preferred embodiment is shown in FIGS. 8-16. The apparatus shown in FIG. 8 has a post 122 lying on the ground. FIG. 8 shows a skid loader 100 with hydraulic cylinders 210 and 212 which manipulate a plate 111 which has post 120 welded perpendicular thereto. A mounting plate 130 is reciprocally mounted to the post 120. A brief operation of the apparatus is that in FIG. 8 a post 122 lying on the ground can be clamped and then by shortening the hydraulic cylinders 210 and 212 from the FIG. 8 position to the FIG. 9 position, the post 122 can be moved to an upright position over a hole in the ground shown below the post 122 in FIG. 9.

Figure 11:
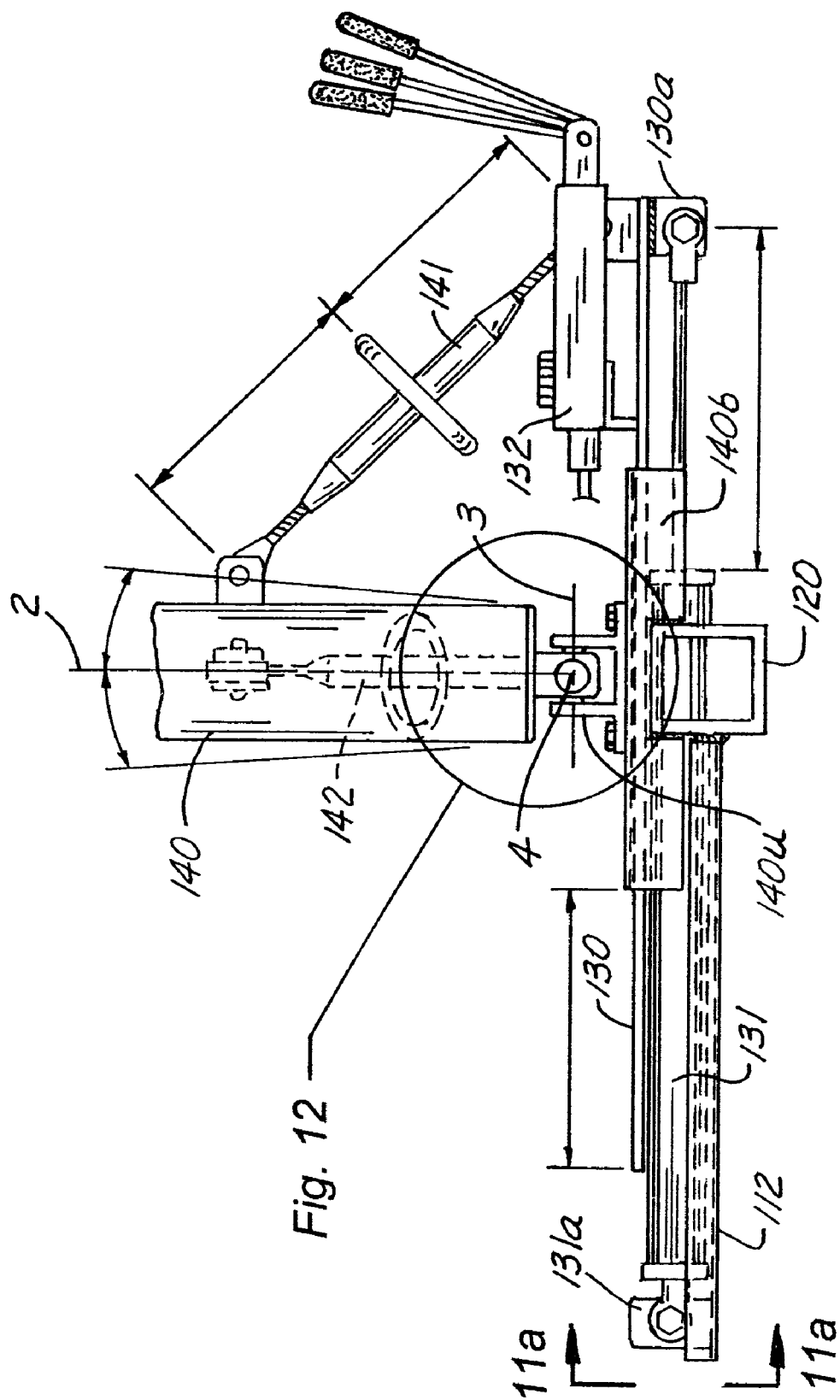
FIG. 11 is a front elevational view of a lower portion of the embodiment of FIG. 8 showing how a universal joint permits virtually unlimited tipping of the upper part of the apparatus and how a hydraulic cylinder can be used to slide a base plate from side to side.
Figure 11A:
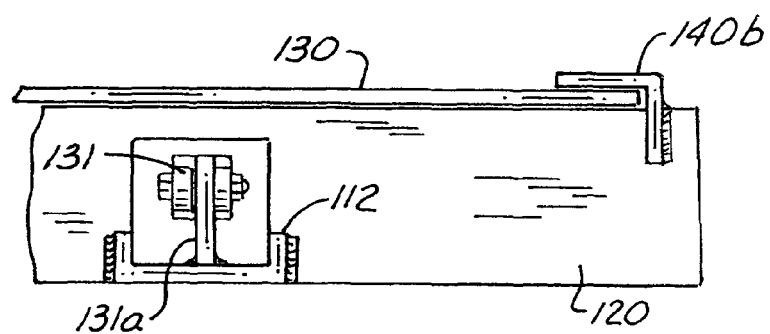
FIG. 11a is a view taken along line 11-11 of FIG. 11.
Figure 11B:
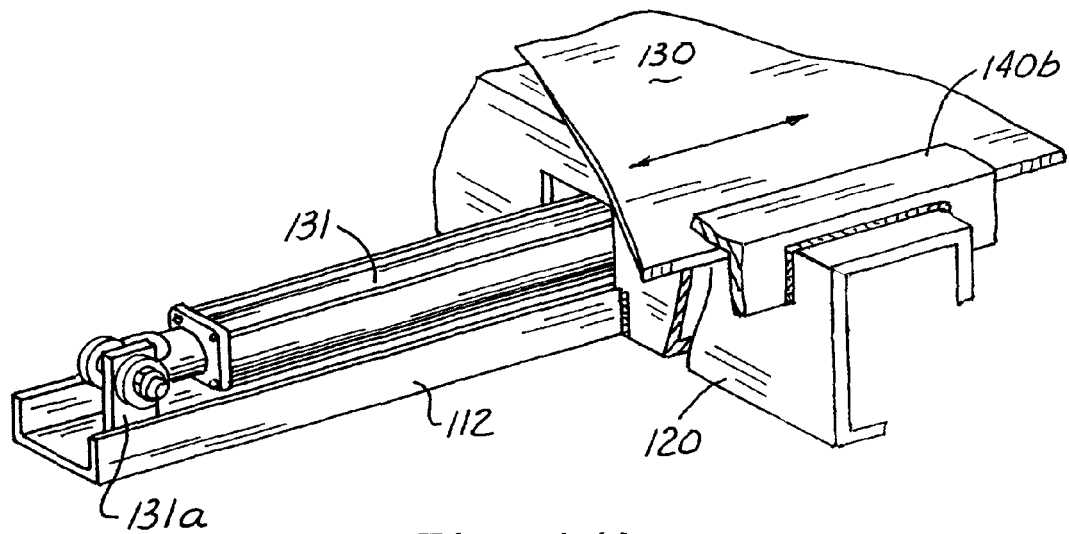
FIG. 11b is a an enlarged perspective view a portion of the structure shown in FIG. 11.
Figure 12:
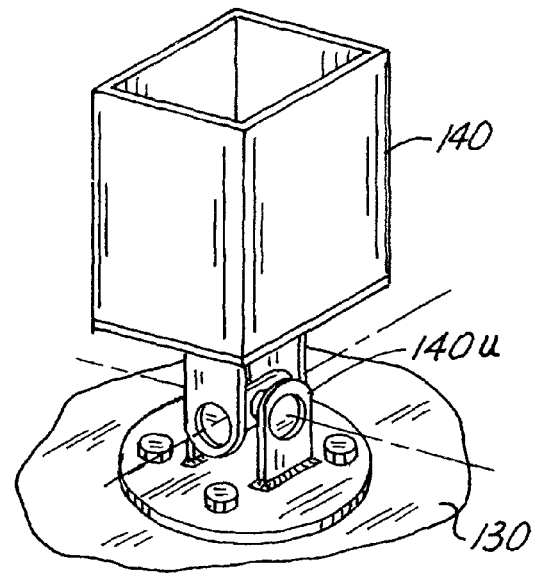
FIG. 12 is an enlarged perspective view of the circled portion of FIG. 11.

The mounting plate 130 can be seen in FIGS. 11, 11a and 11b as being movable with respect to the beam 120 by using the hydraulic cylinder 131 which is pivotally attached at one end to a bracket 131a and which bracket 131a is welded to a beam 112. The other end of the hydraulic cylinder 131 is pivotally attached to a bracket 130a which is welded to the mounting plate 130 so that when the hydraulic cylinder is lengthened, for example as shown in FIG. 11, the mounting plate 130 will move to the right and when hydraulic cylinder 131 is shortened, the mounting plate 130 will move to the left as viewed in FIG. 11. Looking at FIGS. 11a and 11b the beam 120 is shown having a hole in it with hydraulic cylinder 131 extending through it.

Figure 9:
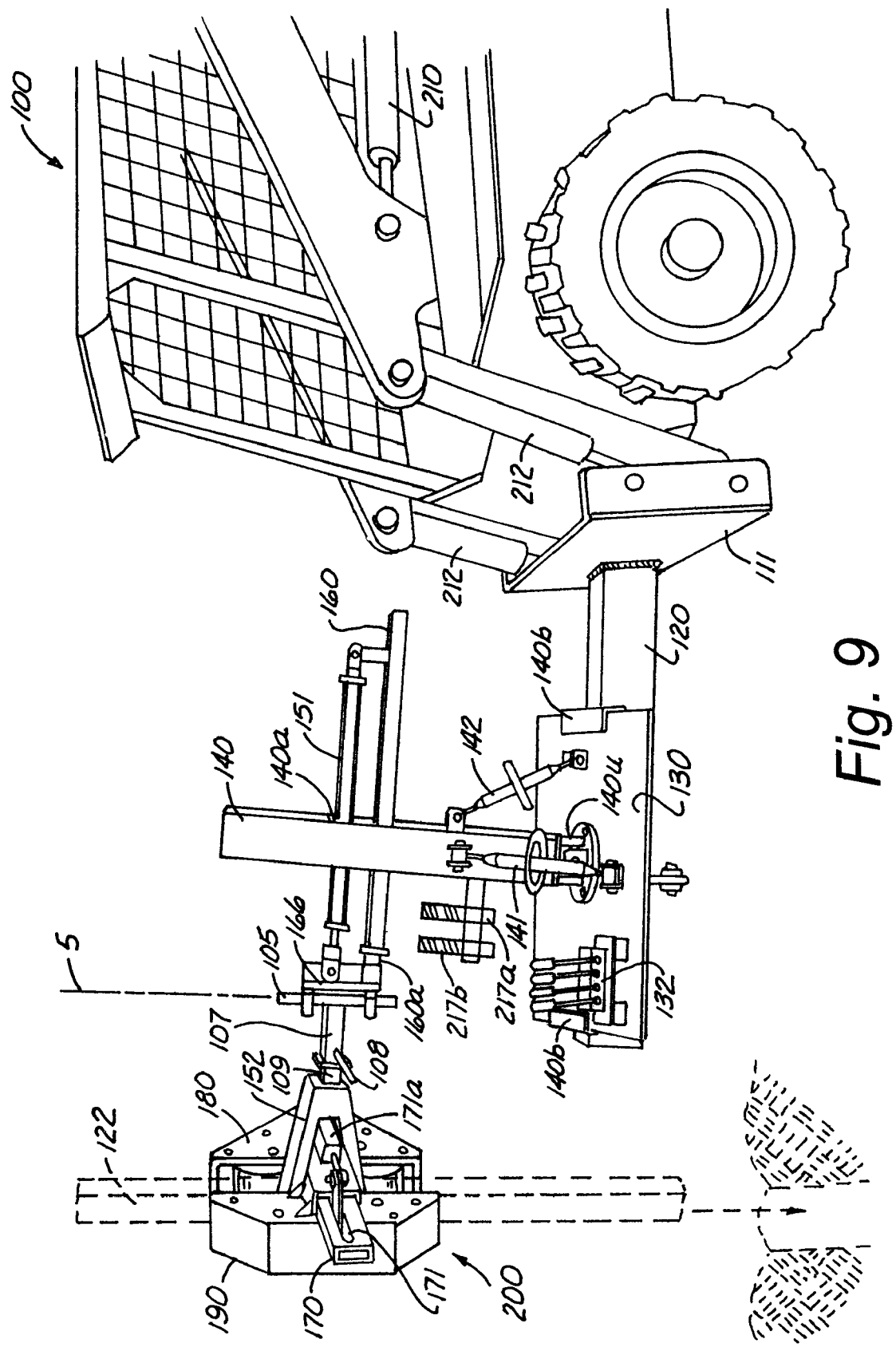
FIG. 9 is a perspective view of the second embodiment of the present invention attached to a skid loader but showing a post in dashed lines to illustrate how a post can be quickly, easily and accurately placed in a post hole and held in a proper position while the post hole is backfilled, tamped and/or while concrete is placed in the post hole.
Figure 10:
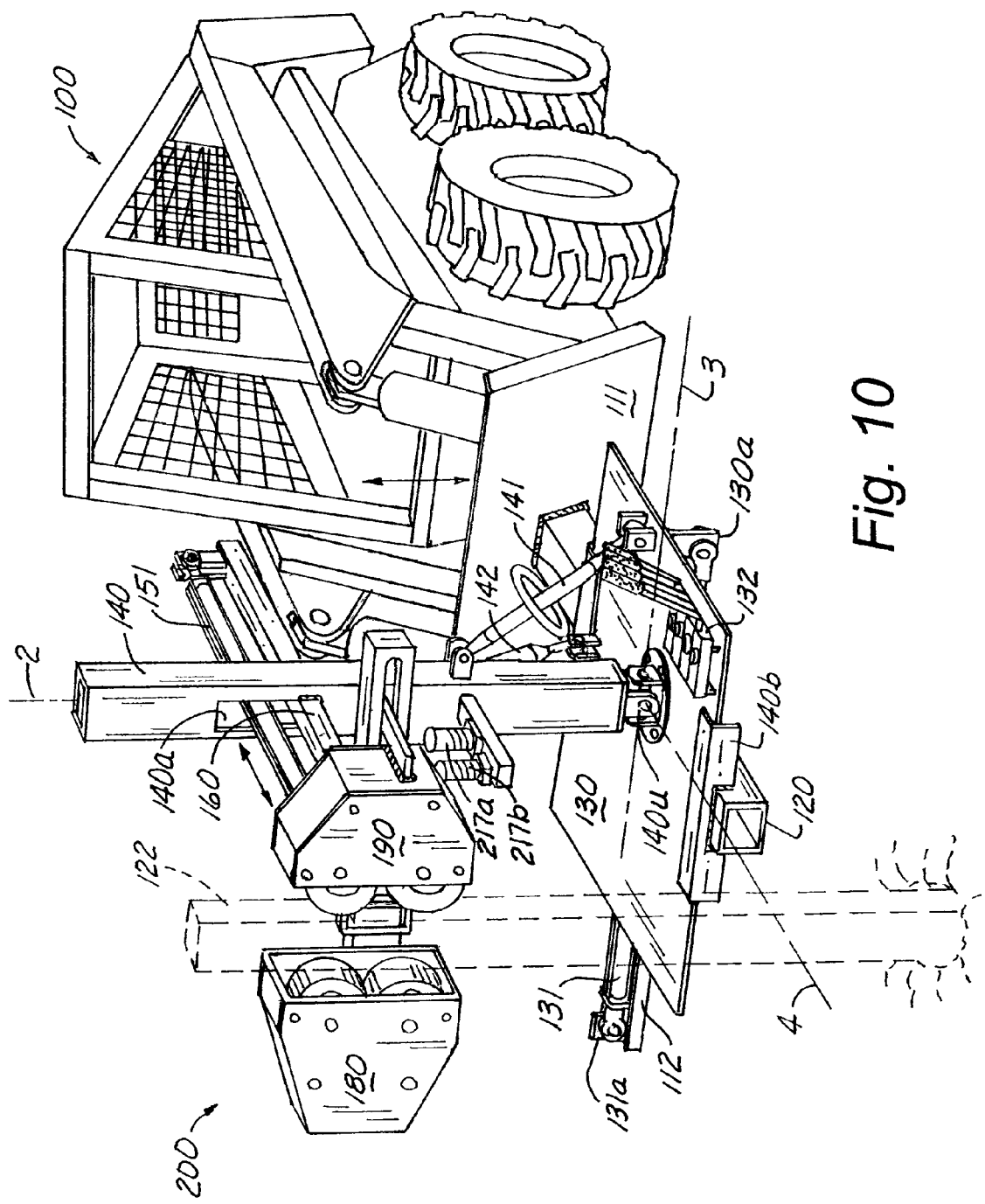
FIG. 10 is a perspective view of the apparatus shown in FIGS. 8 and 9 showing a post and post hole in dashed lines to illustrate how a post can be quickly, easily and accurately placed in a post hole and held in a proper position while the post hole is backfilled, tamped and/or while concrete is placed in the post hole.

The mounting plate 130 is mounted in a reciprocal fashion by brackets 140b as shown in FIGS. 9 and 10. These brackets 140b are welded to post 120 as can best be seen in FIGS. 11a and 11b. A vertical post or first member 140 is mounted to pivot about a universal joint 140u which is bolted to the mounting plate 130. In FIG. 10 it can be seen that turnbuckle 141 pivots the post adjustably along axis 4 and turnbuckle 142 will pivot the post along axis 3 as shown in FIG. 10. Looking at FIG. 11, turnbuckle 41 pivots post or first member 140 about the axis 4 as can be seen by the arrows at the top of FIG. 11.

Figure 13:
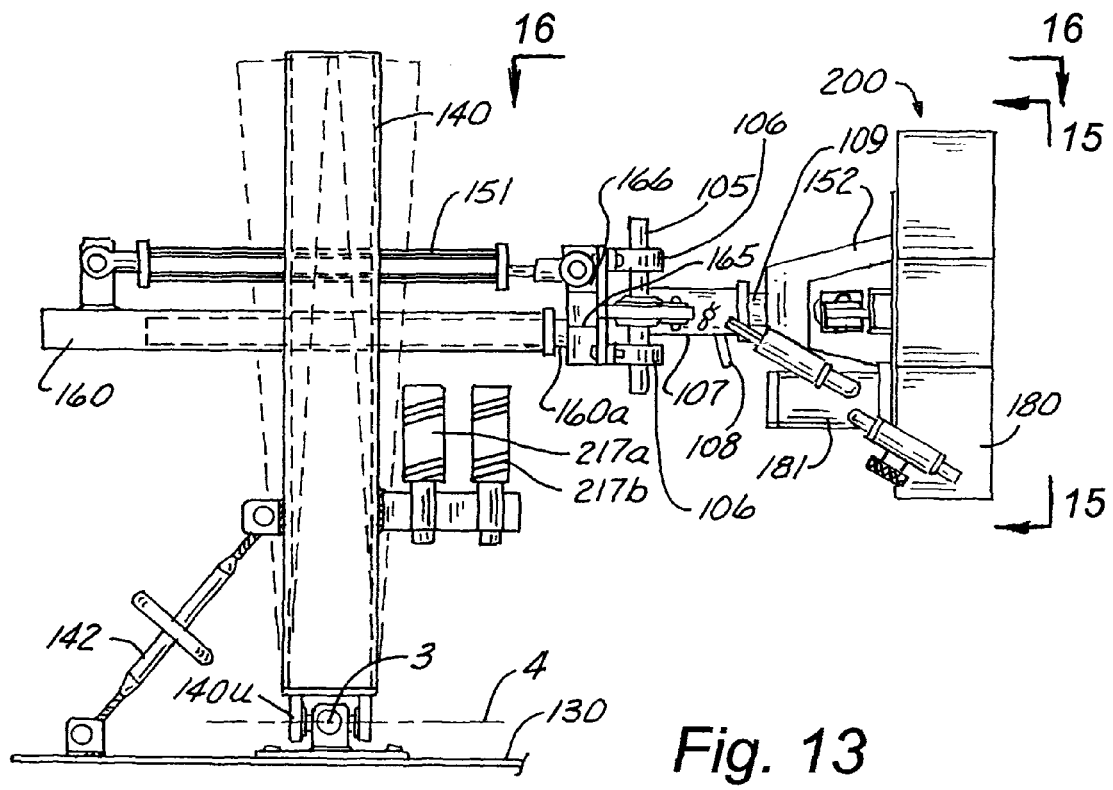
FIG. 13 is a side elevational view showing how lengthening or shortening one of the turnbuckles will pivot a vertical post to the left or right of vertical about one horizontal axis.
Figure 14:
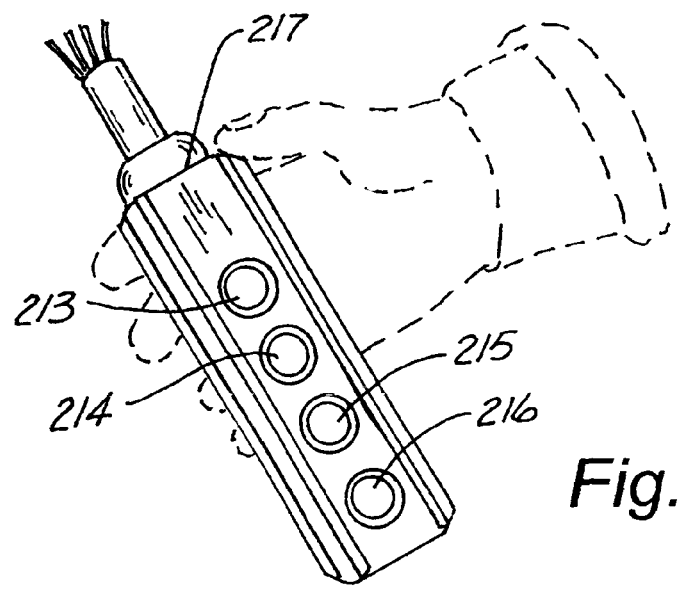
FIG. 14 is a perspective view of a hand held device with four buttons for controlling electric over hydraulic valves to control clamping/unclamping of a post and moving a post up or down once the post has been clamped.

Turning to FIG. 13, it can be seen by referring to the dashed lines that turning the turnbuckle 142 one direction or the other pivots the post or first member 140 about axis 3.

Looking to FIG. 10, a post grasping and moving apparatus 200 is grasping and moving the post 122 vertically up or down. The post 122 is mounted to the vertical post or first member 140 by a beam or second member 160 having a hydraulic cylinder 151 attached at one end thereto, the hydraulic cylinder 151 being shown in FIG. 13 as being attached to a bracket 165. Inside of the beam or second member 160 is a telescoping internal beam or third member 160a which allows the bracket 165 shown in FIG. 13 to move to the right or left depending on whether the hydraulic cylinder 151 is lengthened or shortened.

Looking at FIG. 9, it can be seen that if the hydraulic cylinder 151 is extended, the post 122 and post grasping apparatus 200 will be moved to the left. Still looking at FIG. 9 if the hydraulic cylinder 151 is shortened by using one of the levers on hydraulic control 132, the post 122 and post grasping apparatus 200 will move to the right.

Looking to FIG. 13, the post grasping apparatus 200 will move to the right when the hydraulic cylinder 151 is lengthened and to the left when the hydraulic cylinder 151 is shortened.

Looking to FIG. 10, it can be seen that the hydraulic cylinder 151 and the beam or second member 160 extend through an opening 140a in the upstanding post or first member 140. The beam or second member 160 is actually welded to the post or first member 140 at the bottom of the opening 140a as shown in FIG. 10.

Figure 16:
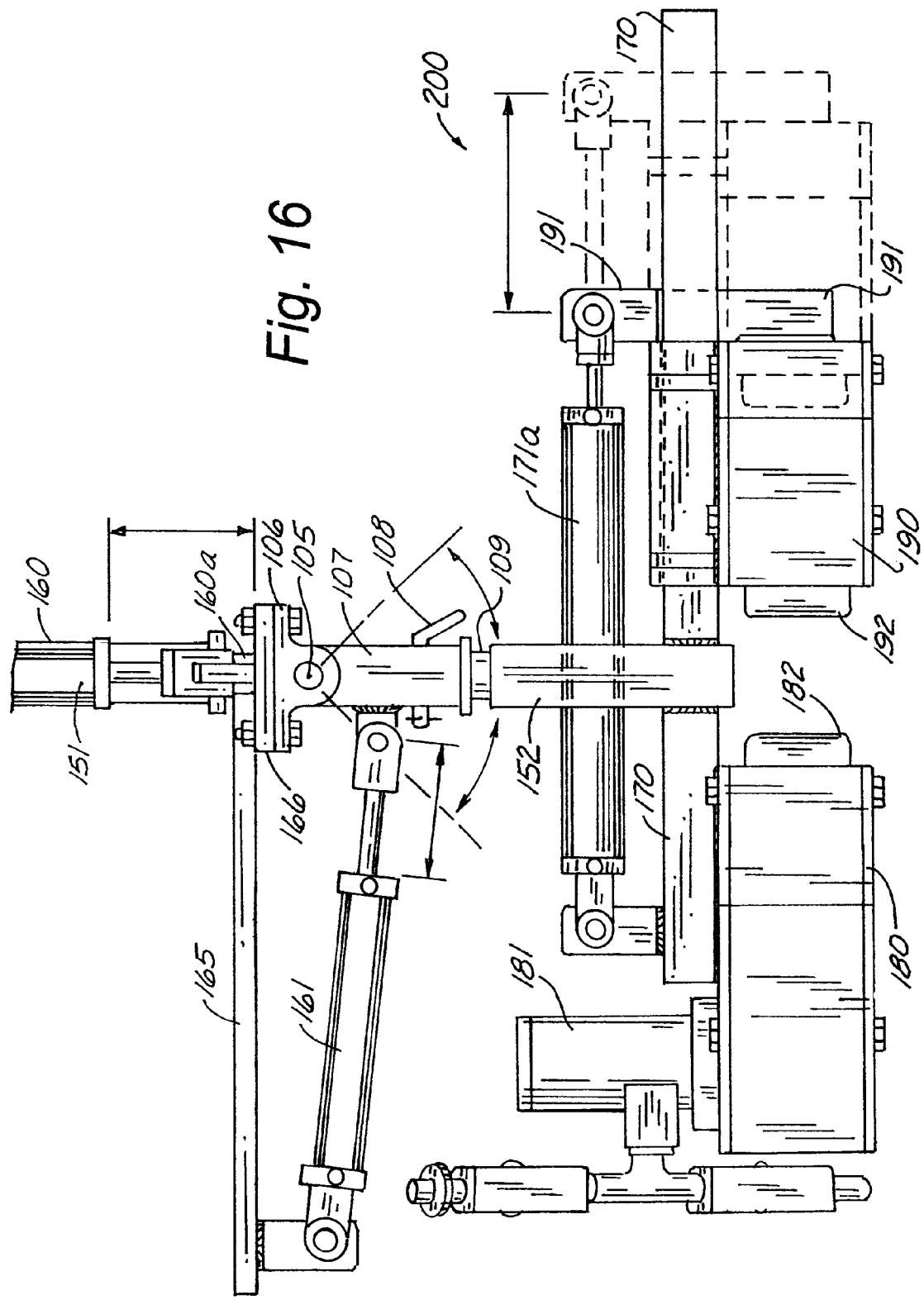
FIG. 16 is an enlarged partial view taken along line 16-16 of FIG. 13.

Referring to FIG. 13, member 166 is rigidly attached to telescoping member or third member 160a, which can also be seen in FIG. 16.

Turning again to FIG. 13, bearings 106 have shaft 105 disposed therein so that the receiver hitch 107 can be pivoted about the pin 105 using hydraulic cylinder 161 shown in FIG. 16. The post grasping and moving device 200, looking at FIG. 13, is attached to the receiver hitch 107, similar to the way that a ball hitch would be attached to the rear of a pickup truck with a receiver, and has a pin 108 which can be placed through openings in receiver hitch 107 and through receiver 109, to which yoke 152 is rigidly attached.

If it is desired to pivot the entire post grasping apparatus 200 about the pin 105, then the hydraulic cylinder 161 as shown in FIG. 16 will be either lengthened or shortened to cause such pivoting about the axis 5 shown in FIG. 9.

Figure 15:
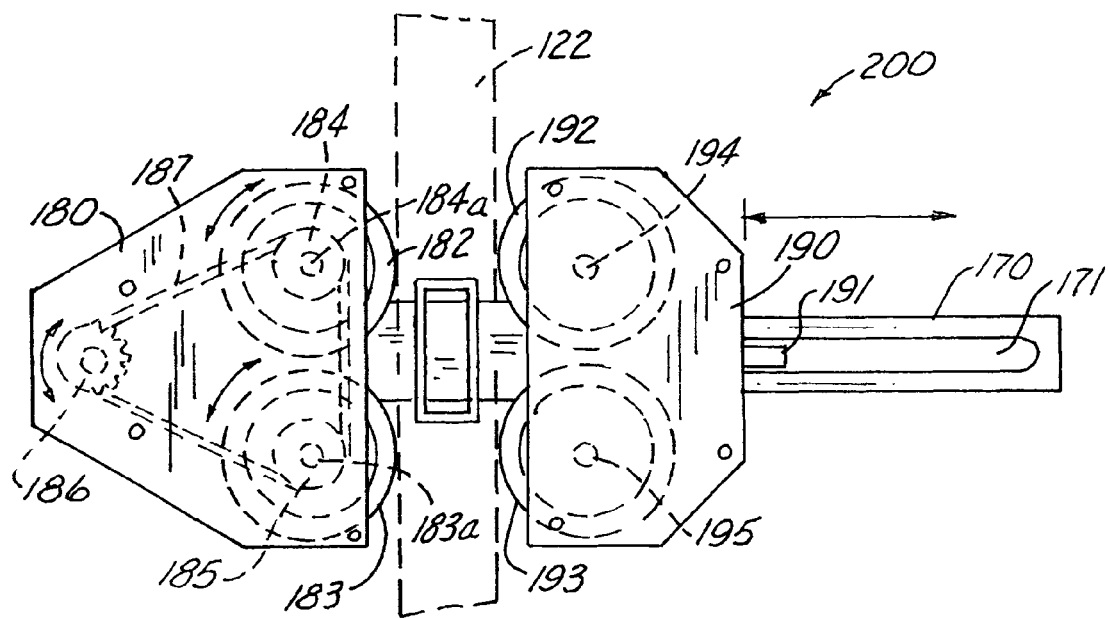
FIG. 15 is a view taken along line 15-15 of FIG. 13 but turned ninety degrees.

The post grasping apparatus 200 can be seen in FIGS. 9, 10, 15 and 16 and has a first side or first clamping device 180 which is rigidly attached to a post 170. The other side or second clamping device 190 of the post grasping apparatus 200 is attached rigidly to a member 191 that slides in slot 171 of beam 170 as shown in FIG. 15.

Referring again to FIG. 16 it can be seen that a hydraulic cylinder 171a is attached solidly through a pivot pin to beam 170 on the left and is attached to the member 191 on the right side so that as the hydraulic cylinder 171a is lengthened to the dashed-lined position shown in FIG. 16, the second clamping device 190 of the grasping device 200 will be moved in that direction as well and of course when the hydraulic cylinder 171a is shortened it will move to the solid line position shown in FIG. 16. This of course allows the post 122 to be solidly pinched and held between rollers 182 and 192 and rollers 183 and 193, respectively, as shown in FIG. 15.

The rollers or wheels 182 and 183 of part 180 of grasping device 200 are rotatable about pins 184a and 183a respectively and are rigidly attached to sprockets 184 and 185. Another sprocket 186 is rotatably attached to the housing or first clamping device 180 and a chain 187 is disposed around sprockets 184, 185 and 186 as shown in FIG. 15.

Referring to FIG. 16, it will be seen that a hydraulic reversible motor 181 is shown, which will rotate the sprocket 186 in one direction when hydraulic fluid is run through it in one direction or will rotate the sprocket 186 in an opposite direction when the flow through the hydraulic motor 181 is reversed.

Referring again to FIG. 15, wheels 192 and 193 are rotatably attached via bearings or shafts 194 and 195 respectively, and these rollers 192 and 193 are not powered but are just idler rollers, though making them powered if synchronized with the opposite direction movement of rollers 182 and 183 would be acceptable as well.

In operation, referring again to FIG. 8, an operator using skid loader 100 would have the apparatus attached thereto and would have lengthened the hydraulic cylinders 210 and 212 that are on the skid loader 100 so that the plate 111 is in the horizontal position shown. This will of course cause the mounting plate 130 to be in a vertical orientation and most importantly this ultimately results in the post grasping apparatus 200 be in the position shown in FIG. 8 so that it can be moved around the post 122. Once the post grabbing parts, i.e. first clamping plate device 180 and second clamping device 190 of post grabbing device 200 are to each side of the post 122, then the hydraulic cylinder 171a is shortened as can be seen in FIG. 16 until the wheels 182, 192, 183 and 193 solidly grasp the post, for example as shown in FIG. 15, wherein the post 122 will be pinched between rollers 182 and 192 and also pinched between rollers 183 and 193.

At that time, the operator would shorten the hydraulic cylinders 210 and 212 of the skid loader 100 in FIG. 8 to move the entire apparatus to the position shown in FIG. 9 which will move the post 122 to a vertical position. The skid loader 100 can then be driven to a position so that the post 122 is approximately above a post hole below it to which it is to be inserted. If the top or bottom of the post 122 is not totally vertical, the turnbuckles 141 and 142 can be manually adjusted as explained above. If the post 122 is too close or too far from the skid loader 100 compared to the hole, the hydraulic cylinder 151 can be either lengthened or shortened to position the post above the hole. If it is desired to pivot the post 122 so that one of the flat sides of the post 122 will be in a certain desired orientation for a pole building, then the hydraulic cylinder 161, as shown in FIG. 16, can be lengthened or shortened to pivot around vertical axis 5 shown in FIG. 9 as explained above.

After this has all been done and the post 122 is in the exact position above the post hole desired, for example in the FIG. 9 position, hydraulic motor 181 is activated so that the wheels 182 and 183 move in a clockwise direction shown in FIG. 15, which will cause the post 122 to be moved downwardly because accordingly idler wheels 192 and 193 will rotate in a counterclockwise direction to hold the post 122 and essentially move in an opposite rotational direction, but in unison with wheels 182 and 183.

If for any reason it is desired to pull the post 122 out of the hole or move it up for any reason, then the flow of hydraulic fluid in 181 is reversed in order to cause the wheels 182 and 183 to move in a counterclockwise direction as shown in FIG. 15 which will of course, due to the friction of the post between the wheels 182 and 183 cause wheels 192 and 193 to turn in a clockwise direction at a similar speed as the post moves upwardly.

Referring again to FIG. 14, the button 213 is the button to control the hydraulic motor 181 for the up position. The button 214 is to control the hydraulic motor 181 for the down position. The button 215 is to control unclamping of the wheels and button 216 clamps the wheels 182, 183, 192, 193 against the post 122 via hydraulic cylinder 171a. These buttons 213-216 operate electric over hydraulic valves 217a and 217b as those shown with hoses going there from in FIG. 13.

Being more specific, the unit 217 activates electric over hydraulic valves 217a and 217b which controls the whole head of the post grasping and moving apparatus 200 as explained previously by using the motor and buttons 213 and 214 to turn the hydraulic motor 181 in one direction or the other to move the post up or down or buttons 215 and 216 to control clamping of the wheels by moving the hydraulic cylinder 171a in or out as shown in FIG. 16 in solid and dashed lines.

Obviously many modifications and variations of the present invention are possible in light of the above teachings. For example it is possible to use make vertical adjustments to a clamped post using the loader end of a skid loader or making vertical adjustments using a three point hitch on a tractor, but usually some tilting occurs when lifting of the post is done this way. But raising or lowering the post this way is considered to be within the scope of this invention. It is therefore to be understood that, within the scope of the appended claims, the invention may be practiced otherwise than as specifically described.

I claim:

1. An apparatus for installing poles for pole buildings comprising:
    a frame adapted to be attached to a prime mover;
    a mounting plate operatively slideably attached to the frame along a first axis;
    a first member having a second axis, the first member being operatively pivotally attached to the mounting plate for pivoting about a third and a fourth axis;
    a second member operatively attached to the first member;
    a third member operatively attached to the second member for movement in a direction along an axis substantially perpendicular to the second axis;
    a fourth member operatively pivotally attached to the third member about a fifth axis substantially parallel to the second axis;
    a first clamping device operatively attached to the fourth member, the first clamping device having at least a first powered roller thereon; and
    a second clamping device having a second roller thereon, the second clamping device being operatively attached to the fourth member; and
    one of the first and second clamping devices being operatively mounted to the fourth member for movement between a first position and a second position, the first position being closer to the other clamping device than the second position is to the other clamping device, whereby a post to be inserted into a post hole can be clamped between the first and second rollers and held by the first and second clamping devices.

2. The apparatus of claim 1 wherein the frame being operatively attached to a ground engaging prime mover for facilitating selective movement of the frame up and down.

3. The apparatus of claim 1 wherein a first actuator is operatively attached to the frame and to the mounting plate for moving the mounting plate along the first axis thereof.

4. The apparatus of claim 3 wherein the first actuator is a hydraulic cylinder.

5. The apparatus of claim 1 wherein a second actuator is operatively attached to the mounting plate and to the first member for selectively pivoting the first member about the third axis.

6. The apparatus of claim 5 wherein the second actuator is a turnbuckle.

7. The apparatus of claim 5 wherein a third actuator is operatively attached to the mounting plate and to the first member for selectively pivoting the first member about the fourth axis.

8. The apparatus of claim 5 wherein the actuator is a turnbuckle.

9. The apparatus of claim 1 wherein a fourth actuator is operatively attached to the second member and to the third member for selectively moving the third member along the fourth axis with respect to the second member.

10. The apparatus of claim 9 wherein the fourth actuator is a hydraulic cylinder.

11. The apparatus of claim 1 wherein a fifth actuator is operatively attached to the fourth member and to the second clamping device for controlling selective movement of the second clamping device between the first position and the second position of the second clamping device, the first position being closer to the first clamping device than the second position is to the first clamping device.

12. The apparatus of claim 11 wherein the fifth actuator is a hydraulic cylinder.

13. The apparatus of claim 1 wherein the powered roller is powered by a reversible motor operatively attached thereto.

14. The apparatus of claim 13 wherein the reversible motor is a hydraulic motor.

15. The apparatus of claim 1 further comprising as third roller on the first clamping device and a fourth roller on the second clamping device, the first second third and fourth rollers being rotatably disposed about individual respective axes that are parallel to each other.

16. The apparatus of claim 15 wherein the third roller is powered by said reversible motor and synchronized for rotation with the first roller.

17. The apparatus of claim 1 wherein the mounting plate has a first horizontal position and a second vertical orientation and is moveable between the first horizontal axis and the second vertical axis by at least one hydraulic cylinder operatably attached to the prime mover.

* * * * *